Nov. 10, 1942.　　　　G. A. SMITH　　　　2,301,757
WELL SURVEYING INSTRUMENT
Filed March 27, 1941

WITNESS:
Rob P Michel

INVENTOR
George A. Smith
BY
Bussers Harding
ATTORNEYS.

Patented Nov. 10, 1942

2,301,757

UNITED STATES PATENT OFFICE 2,301,757

WELL SURVEYING INSTRUMENT

George A. Smith, Philadelphia, Pa., assignor to Sperry-Sun Well Surveying Company, Philadelphia, Pa., a corporation of Delaware Application March 27, 1941, Serial No. 385,424

5 Claims. (Cl. 33—205.5)

This invention relates to a well surveying apparatus of the type designed to record the direction taken by a bore hole at one or more predetermined points.

Numerous well surveying devices have been proposed and are in use for recording the inclination and/or direction of inclination of a bore hole at one or more predetermined points. Some of these instruments are of so-called multiple shot type arranged to make a large number of records as the instrument is moved through a bore hole. Certain other instruments are designed to make only a limited number of records, while still other instruments, known as single shot instruments, are designed to make only single records in one operation. The present invention relates particularly to instruments of the two latter classes, and specifically to such instruments of electrically operating type, i. e., in which the making of a record is dependent directly or indirectly upon flow of an electric current.

The instruments of the last two types have been generally controlled by clockwork mechanism, which first delays the production of a record, then effects the making of a record, and later prevents the formation of additional confusing recording markings. Such clockwork mechanisms are expensive and troublesome and very likely to get out of order under the conditions involved in field use of the instruments, during which they are handled by unskilled workers and are subject to much abuse.

In the application of Ring Roland, Serial No. 313,706, filed January 13, 1940, there is described an instrument which may be considered as of single shot type, though it is capable of providing a plurality of separate records if desired. This instrument comprises essentially a universally mounted pendulum provided with a point engaging a record disc. The record disc and point form part of a continuously closed electrical circuit through which current is caused to flow either by a battery source or by reason of the chemical composition of the recording disc and associated elements.

The making of a record before the instrument comes to rest in a predetermined position is prevented by reason of the fact that the strength of the electrical current is limited and the fact that the pendulum will be continuously moving while the instrument is being lowered, so as not to remain in any one position long enough to affect the record member. When this instrument is operated on a wire line, during the lowering, the shaking of the instrument prevents the making of a record. It is then held at rest in predetermined position for a period long enough to make a record and is then withdrawn, whereupon it is again shaken to such extent that no further obliterating records are made. There is thus no necessity for any timing means whatever, and the instrument is consequently extremely simple and reliable. If a number of records are desired at the different positions, it is only necessary to bring the instrument to rest at various locations, whereupon separate markings on the record member are produced which may be distinguished from each other by their intensity if rest periods of different durations are used.

By reason of its ruggedness, this instrument is particularly well adapted to go-devil operation, being dropped through a drill stem to come to rest on a suitable arresting member, for example, at the position of the bit. It is allowed to remain there at rest for a period necessary to make a record, whereupon the drill stem is withdrawn and with it the instrument. During such withdrawal it is subject to agitation, so that the record made is not obliterated.

There is one practical consideration, however, which enters into this operation, namely, that during the withdrawing operation the drill stem may be stationary through one or more substantially long periods. Not only, for example, may something occur to prevent the more or less continuous removal of the drill stem, but in withdrawing a stem of great length, the workmen will generally insist on taking a rest period which, while short, may be of sufficient duration to leave the instrument at rest long enough to produce a second record. Said Ring application shows one method of preventing such record being made by causing the electrical circuit to be interrupted by means of a go-devil. It is one object of the present invention to provide an alternative improved means for interrupting the electrical circuit after a record is made to prevent subsequent production of records while the instrument may be at rest.

Specifically, the invention contemplates locating in the instrument an inexpensive and easily placed and removable element for interrupting an electrical circuit after a predetermined and rather roughly defined interval, it being quite unnecessary to provide the break in the circuit at any accurately predetermined time. As will be evident from the following description, the invention is applicable generally to well surveying instruments, and is not limited to association with the type of instrument described in the Ring application. For example, it is equally applicable to instruments in which prolonged exposure of a photographic paper to a minute beam of light may produce a record only when the instrument is at rest for a prolonged period. It is also applicable even in association with more accurate timing means for insuring interruption of a well surveying instrument circuit after a predetermined interval elapses.

The above indicated and other more specific objects of the invention will become apparent from the following description, read in conjunction with the accompanying drawing, in which.

Figures 1A, 1B, 2, 3:
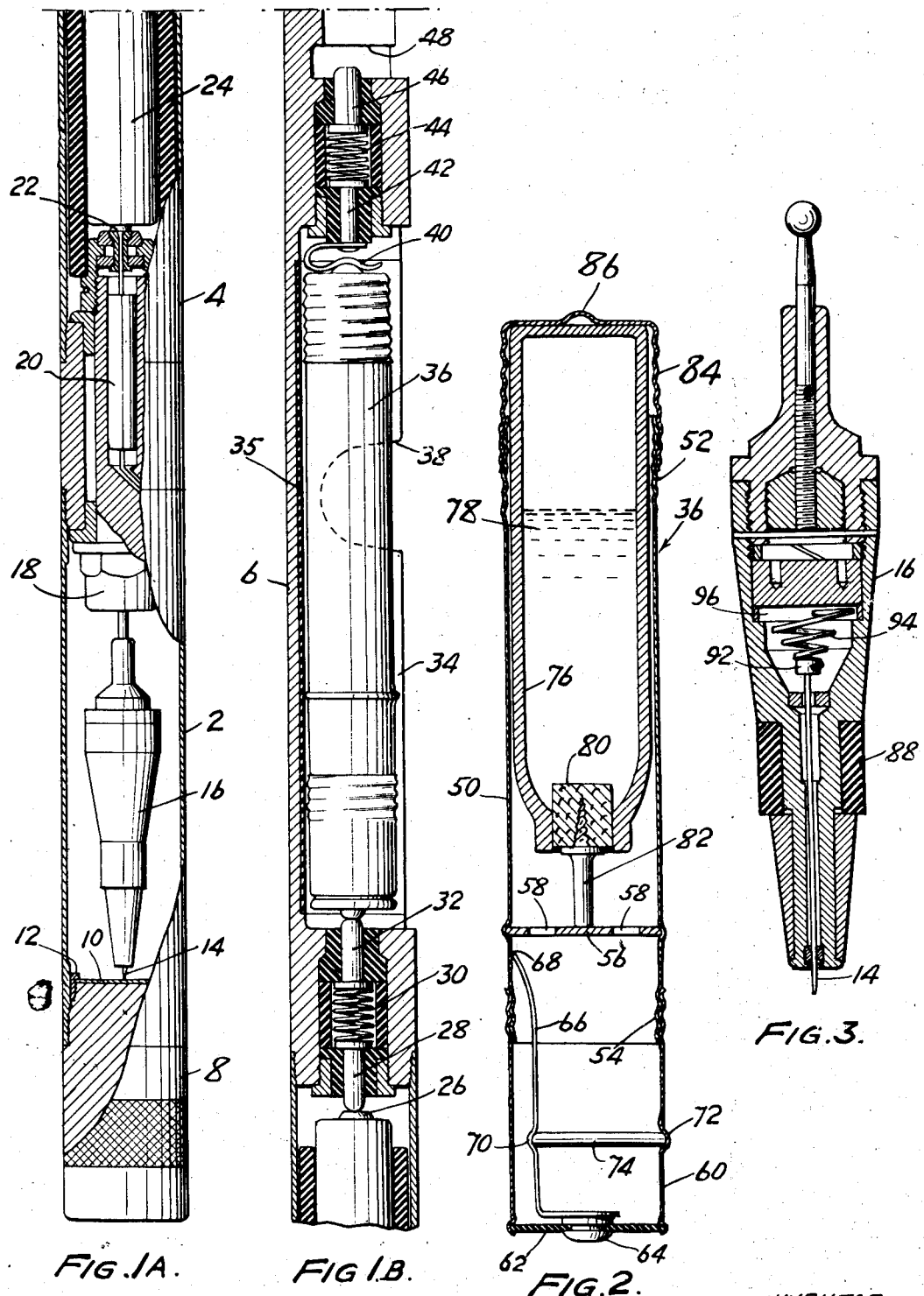
Figures 1A and 1B are sectional views showing, respectively, lower and upper parts of a well surveying instrument embodying the invention.
Figure 2 is an enlarged sectional view showing the improved time controlling means.
Figure 3 is an enlarged sectional view showing details of the pendulum used in the instrument.

The instrument comprises a plurality of suitably connected tubular sections 2, 4 and 6, constituting the inner supporting housing of the instrument adapted to be received within a protective casing resistant to mud pressures encountered in a bore hole. The bottom of the lower section of the casing is provided with a threaded plug 8 to which may be clamped a record member 10 by means of a flanged threaded ring 12. This record member 10 may be of paper coated or impregnated with material adapted to be affected by the passage of an electrical current in the fashion outlined in said Ring application. So far as the recording parts of the instrument are concerned, they are essentially those of said application.

Engaging the record disc 10 is the pointed lower end of a wire 14, which is slidably mounted, in a fashion later described, in a pendulum 16 having a universal mounting in a fitting 18, which is insulated from the housing. Electrically connected to the pendulum and in series with it is a current limiting and stabilizing resistor 20, which is, in turn, connected to a contact point 22 adapted to be engaged by the bottom of a battery 24. This battery may form one of a series associated in the usual flash-light fashion end to end, the positive pole of the uppermost battery engaging a pin 28 insulated from the housing and pressed downwardly by a spring 30. A pin 32 is pressed upwardly by the same spring 30.

The section 6 of the housing is provided with a side opening 34 in which is receivable a cartridge 36 described in greater detail hereafter. The inner wall of the section 6 is provided with an insulating liner 35 and the sides of the housing 6 are cut away, as indicated at 38, to receive the fingers to facilitate removal and replacement of the cartridge 36. A spring 40 carried by a pin 42, is adapted to hold the upper end of the cartridge. Above this is a spring 44 pressing upwardly a pin 46. All of the elements 40, 42, 44 and 46 are insulated from the metallic parts of the housing as indicated. The pin 46 projects into a slot 48 in the upper end of the section 6 into which slot there may be inserted a conducting disc for the purpose of electrically connecting the pin 46 to the housing. This provides a convenient switching means for opening or closing the electrical circuit, as hereafter described.

The cartridge 36 is illustrated in detail in Figure 2. It comprises a sheet metal tube 50 threaded at its upper and lower ends as indicated at 52 and 54. A disc 56, which may be of metal or other material, is snapped into a groove formed in the tube 50 and is provided with openings 58. Threaded on the lower end of the tube 50 is a closure 60, which is provided with a bottom 62 in the form of a disc of insulating material. In this is secured, by a rivet 64 (having a concave lower end to engage pin 32) a leaf 66 of spring metal provided with a pointed free end 68. Normally, the leaf 66 tends to spring inwardly away from the position illustrated in Figure 2, but it is held in the position illustrated by means of a rod 74 entering the depressions 70 and 72 in the spring 66 and closure 60, respectively. This rod 74 is formed of insulating soluble plastic material, as hereinafter described.

The tube 50 is adapted to receive a bottle 76, which may be of glass, metal or any other suitable material. The neck of this bottle is initially closed by a stopper 80, in which is secured a pin 82 engaging the bridging disc 56. A cap 84 may engage the first few turns of the threads 52 when the device is in the condition illustrated. The cap 86 is provided with a projection 86' adapted to fit into a depression provided in the spring 40.

In Figure 3 certain details of the pendulum are illustrated. The lower portion of the pendulum is provided with an insulating sleeve 88 to prevent the pendulum's engaging the walls of the section 2 to short circuit the contact between pin 14 and disc 10. To secure a high degree of sensitivity, the pin 14, in the form of a wire, is carried by a head 96 suspended by a light spiral spring 94 from a ring 96 fixed inside the body of the pendulum. The spring 94 is so chosen that the pressure exerted by the pin 14 on the disc 10 is substantially less than the weight of a pin sufficiently long to be properly guided in the pendulum and of sufficient diameter to avoid accidental bending. Thus pressure on the record disc is very light and, in view of the substantial weight of the pendulum bob, does not result in causing friction sufficient to keep the bob appreciably out of a vertical position. The error caused by friction may be held to far less than the limits of error in reading the record on the disc, i. e., the error may be made less than one or two minutes.

As this instrument is supplied to an operator, the cartridge 50 will be in the condition illustrated in Figure 2, the stopper 80 being held within the mouth of the bottle 76 to retain the liquid 78. As indicated above, the rod 74, tending to hold the leaf 66 with its point in contact with the inner wall of the tube 50, is of plastic material. The material actually used is subject to great variation. It may be practically any one of the well known plastics in present day use, as well as any one of various substances not generally used as plastics, for example, various resins, waxes or the like. Suitable materials may be, for example, "vinylite," "victron" or the like. The liquid 78 is chosen so as to be a solvent of the material of the rod 74. Generally speaking, it will be an organic liquid non-conductive of electricity. If hard waxes are used having sufficiently high melting points not to disintegrate at the temperatures encountered in a bore hole, this liquid may be a petroleum oil. If various resinous materials are used for the rod, the liquid may be an alcohol. In the case of the particular plastics mentioned above, the liquid may be an organic ketone or ester dissolving "vinylite" or an organic ester or aromatic hydrocarbon capable of dissolving "victron." The particular materials usable need not be described in detail, as the choices are extremely large. It will suffice to say that the liquid should be desirably non-conducting or conductive of electricity to only a slight degree and should have a sufficiently high boiling point so as not to create damaging vapor pressures at any temperatures encountered in a bore hole. The rod 74 may be of any soluble material having sufficient rigidity to maintain the spring 66 in the position illustrated and of a type not liable to softening at temperatures encountered in a bore hole or, at any rate, at such temperatures as to which it may be subjected in the limited time before its solution is supposed to occur.

The cartridges provided as indicated at 36 are subject to no deterioration over long periods of time and can be supplied inexpensively in large quantities to be used in the operation of the instrument.

When the instrument is to be operated, for example, in go-devil fashion, it is assembled as illustrated in Figures 1A and 1B, but the cartridge 36 is not placed therein until the time for placing it in its protective casing and dropping it into the drill stem. When this is to be done, the cap 84 on the cartridge 36 is screwed downwardly, thus applying pressure to the upper end of the bottle 76 until the stopper 80 is forced into the bottle. This stopper is preferably so formed as to float in the liquid 78, so that it immediately rises to avoid blocking of the neck of the bottle. The liquid 78 thereupon flows into the closure 60 and the lower portion of the tube 50 about the rod 74 and a slow dissolving action immediately begins. The cartridge is then snapped into position between the spring 40 and the pin 32. A metal disc is inserted in the slot 48 to connect the pin 46 electrically with the housing. The assembly may then be placed in the protective casing and dropped into the drill stem.

The drill stem is then held stationary for a sufficient time to permit a record to be made and withdrawing of the drill stem may thereafter be effected. Eventually, and at a time safely delayed until the completion of making of the record, the solvent 78 will have so weakened the pin 74 that the leaf 86 will cause it to collapse or break and will move out of engagement with the wall of the tube 50. Thus the electrical circuit is interrupted, and if thereafter the drill stem is held stationary for any reason, no subsequent record will be made. The instrument will be ultimately brought to the surface, whereupon the record disc may be removed and examined.

It will be evident that under the circumstances the time of opening of the circuit at the point 88 is not critical. The time may be predetermined within permissible limitations by control of the diameter of the pin 74, or, if a particular pin is used, by control of the solvent 78. This latter may be effected, for example, by diluting a solvent liquid with a liquid which in itself is non-solvent of the matter of the pin. For example, if the pin is of a material solvent in a ketone but not in an alcohol, a mixture of the ketone and alcohol may be provided to secure solution at any roughly predetermined time.

Since various delays may be desirable, cartridges 36 having different approximate times of interruption of the electrical circuit may be provided, the approximate time being marked on the cartridge. Noting what cartridge has been used, the operator of the instrument can then determine for how long a period the drill stem must be maintained in motion, knowing that after the elapse of such time the drill stem may be held stationary if desired.

In view of the removability and replaceability of the cartridge, it will be evident that the disc insertible in the slot 48 is not essential for the operation of the device as just described. However, this is preferably provided so that the instrument is available for wire line operation as well. In such case, instead of a cartridge such as 36, the circuit may be completed merely by locating between the spring 40 and pin 32 a conducting member of metal, i. e., a dummy cartridge. While the removability of this may be used to effect opening and closing of the electrical circuit, a disc insertible in the slot 48 is more readily removable and is, therefore, preferable.

The cartridges 36 may be returned to the party supplying the instrument for refilling or may be refilled in the field by the operator, who may have a supply of rods 74 and the solvent 78. The stopper may be readily withdrawn from the bottle by engagement of pin 82 by pliers. Even though the cartridge 50 is not carefully cleaned after use, with the result that it may contain a coating of the insulating material of the rod 74 after evaporation of the solvent, this is not of consequence inasmuch as after the pin 74 is placed in position when the closure 60 is located on the tube the point 68 of the spring 66 will scrape the interior of the tube 50, cutting away any such deposit and effecting metal to metal contact.

What I claim and desire to protect by Letters Patent is:

1. A well surveying instrument comprising means for supporting a record member, electrically operating means for recording position of the instrument on said record member, means providing a holder having a pair of electrical contact portions in the circuit of said electrically operated means, and a device arranged to be removably assembled with said holder to bridge electrically, and to close said circuit between, said contact portions, said device comprising means for interrupting its electrical continuity between said contact portions after a predetermined time interval to open permanently the circuit of said electrically operated means.

2. A well surveying instrument comprising means for supporting a record member, electrically operating means for recording position of the instrument on said record member, means providing a holder having a pair of electrical contact portions in the circuit of said electrically operated means, and a device arranged to be removably assembled with said holder to bridge electrically, and to close said circuit between, said contact portions, said device comprising means for interrupting its electrical continuity between said contact portions after a predetermined time interval to open the circuit of said electrically operated means, said interrupting means comprising a soluble member for maintaining said electrical continuity and a slowly acting solvent therefor adapted to be brought in contact with said soluble member during operation of the instrument.

3. A well surveying instrument comprising means for supporting a record member, electrically operating means for recording position of the instrument on said record member, means providing a holder having a pair of electrical contact portions in the circuit of said electrically operated means, and a device arranged to be removably assembled with said holder to bridge electrically, directly by assembly with said holder, and to close said circuit between, said contact portions, said device comprising means for interrupting its electrical continuity between said contact portions after a predetermined time interval to open permanently the circuit of said electrically operated means.

4. A well surveying instrument comprising means for supporting a record member, electrically operating slowly acting means for recording position of the instrument on said record member, means providing a holder having a pair of electrical contact portions in the circuit of said electrically operated means, and a device arranged to be removably assembled with said holder to bridge electrically, and to close said circuit between, said contact portions, said device comprising means for interrupting its electrical continuity between said contact portions after a predetermined time interval to open permanently the circuit of said electrically operated means.

5. A well surveying instrument comprising means for supporting a record member, electrically operating means for recording position of the instrument on said record member, means providing a holder having a pair of electrical contact portions electrically joined to the circuit of said electrically operating means, and a device arranged to be removably assembled with said holder to bridge said contact portions, said device comprising means for controlling electrical continuity between said contact portions after a predetermined time interval, thereby to affect the operation of said recording means.

GEORGE A. SMITH.